U S010713304B2

(12) United States Patent
Cao et al.

(10) Patent No.: US 10,713,304 B2
(45) Date of Patent: Jul. 14, 2020

(54) ENTITY ARRANGEMENT BY SHAPE INPUT

(71) Applicant: International Business Machines Corporation, Armonk, NY (US)

(72) Inventors: Qifeng Cao, Tokyo (JP); Shunsuke Ishikawa, Tokyo (JP); Keisuke Nitta, Koshigaya (JP); Yuka Nomura, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 858 days.

(21) Appl. No.: 15/006,163

(22) Filed: Jan. 26, 2016

(65) Prior Publication Data

US 2017/0212642 A1   Jul. 27, 2017

(51) Int. Cl.
*G06F 3/048* (2013.01)
*G06F 16/904* (2019.01)

(52) U.S. Cl.
CPC .................................. *G06F 16/904* (2019.01)

(58) Field of Classification Search
CPC .......................................... G06F 3/0481–0489
See application file for complete search history.

(56) References Cited

U.S. PATENT DOCUMENTS

| 5,471,578 | A | * | 11/1995 | Moran | G06F 3/04842 |
| | | | | | 715/764 |
| 5,544,265 | A | * | 8/1996 | Bozinovic | G06K 9/222 |
| | | | | | 382/202 |
| 5,563,991 | A | * | 10/1996 | Mahoney | G06K 9/00476 |
| | | | | | 382/113 |
| 5,798,769 | A | * | 8/1998 | Chiu | G06T 11/206 |
| | | | | | 345/442 |
| 5,861,886 | A | * | 1/1999 | Moran | G06F 3/04817 |
| | | | | | 152/209.1 |
| 5,880,743 | A | * | 3/1999 | Moran | G06T 13/80 |
| | | | | | 345/473 |
| 5,886,698 | A | * | 3/1999 | Sciammarella | G06F 3/0486 |
| | | | | | 707/999.005 |
| 6,029,172 | A | * | 2/2000 | Jorna | G06F 17/30994 |
| 6,236,987 | B1 | * | 5/2001 | Horowitz | G06Q 40/00 |
| 6,317,739 | B1 | * | 11/2001 | Hirata | G06F 17/30395 |
| 6,459,442 | B1 | * | 10/2002 | Edwards | G06F 3/04883 |
| | | | | | 715/700 |
| 6,968,511 | B1 | * | 11/2005 | Robertson | G06F 3/048 |
| | | | | | 715/205 |
| 7,028,050 | B1 | * | 4/2006 | Rose | G06F 17/30265 |
| 7,035,240 | B1 | * | 4/2006 | Balakrishnan | H04W 84/18 |
| | | | | | 370/338 |

(Continued)

FOREIGN PATENT DOCUMENTS

| JP | 2000076464 A | 3/2000 |
| JP | 2005100417 A | 4/2005 |
| JP | 2013142980 A | 7/2013 |

OTHER PUBLICATIONS

"Conceptual Dictionary", Weblio, Printed on: Aug. 5, 2015, 3 pages, <http://ejje.weblio.jp/content/conceptual+dictionary>.

*Primary Examiner* — Steven B Theriault
(74) *Attorney, Agent, or Firm* — Isaac J. Gooshaw

(57) ABSTRACT

In an embodiment of the present invention, a figure is received, where the figure is created by a user. One or more entities are received in the figure. In response to receiving the one or more entities in the figure, the one or more entities are arranged in the figure according to a protocol.

25 Claims, 4 Drawing Sheets

(56) References Cited

U.S. PATENT DOCUMENTS

| | | | |
|---|---|---|---|
| 7,136,082 B2* | 11/2006 | Saund | G06K 9/00409 345/619 |
| 7,218,330 B1* | 5/2007 | Winkenbach | G06F 3/04842 345/442 |
| 7,246,128 B2* | 7/2007 | Jordahl | G06F 16/24578 |
| 7,271,804 B2* | 9/2007 | Evans | G06F 17/3061 345/440 |
| 7,292,243 B1* | 11/2007 | Burke | G09B 5/00 345/440 |
| 7,295,708 B2* | 11/2007 | Chen | G06F 17/242 382/181 |
| 7,307,623 B2* | 12/2007 | Enomoto | G06F 3/0481 345/156 |
| 7,324,691 B2* | 1/2008 | Li | G06K 9/00476 382/181 |
| 7,394,936 B2* | 7/2008 | Li | G06K 9/222 382/186 |
| 7,400,771 B2* | 7/2008 | Li | G06K 9/222 382/181 |
| 7,506,245 B2* | 3/2009 | Jaeger | G06F 9/451 715/230 |
| 7,526,737 B2* | 4/2009 | Simmons | G06F 3/03545 345/173 |
| 7,543,248 B2* | 6/2009 | Denoue | G06F 3/0481 715/857 |
| 7,603,628 B2* | 10/2009 | Park | G06F 3/04817 715/744 |
| 7,730,429 B2* | 6/2010 | Kruse | G06F 17/24 706/11 |
| 7,818,688 B2* | 10/2010 | Narita | G06F 16/338 715/841 |
| 7,907,141 B2* | 3/2011 | Saund | G06K 9/00416 345/440 |
| 8,014,607 B2* | 9/2011 | Saund | G06F 3/04883 382/187 |
| 8,230,346 B2* | 7/2012 | Ishida | G06F 17/30873 707/708 |
| 8,296,666 B2* | 10/2012 | Wright | G06F 17/30017 715/764 |
| 8,315,482 B2* | 11/2012 | Hou | G06K 9/00422 382/101 |
| 8,316,022 B2* | 11/2012 | Matsuda | G06K 9/6217 707/736 |
| 8,402,382 B2* | 3/2013 | Agarawala | G06F 3/0483 345/173 |
| 8,429,565 B2* | 4/2013 | Agarawala | G06F 3/016 715/701 |
| 8,484,140 B2* | 7/2013 | Thompson | G06N 20/00 706/12 |
| 8,533,205 B2* | 9/2013 | Finkelstein | G06F 16/954 707/749 |
| 8,593,488 B1* | 11/2013 | Thimbleby | G06T 11/00 345/619 |
| 8,659,621 B1* | 2/2014 | Stiglitz | G06T 19/20 345/619 |
| 8,661,364 B2* | 2/2014 | Crystal | G06F 17/30572 715/738 |
| 8,732,616 B2* | 5/2014 | Bellamy | G06F 3/0481 715/702 |
| 8,739,051 B2* | 5/2014 | Green | G06F 3/0482 715/767 |
| 8,739,068 B2* | 5/2014 | Albertson | G06T 11/206 345/440 |
| 8,749,497 B2* | 6/2014 | Elias | G06F 3/04845 178/18.01 |
| 8,762,871 B2* | 6/2014 | Albertson | G06F 3/04845 715/762 |
| 8,832,119 B2* | 9/2014 | Girgensohn | G06F 16/44 707/749 |
| 8,860,763 B2* | 10/2014 | Privault | G06T 11/60 345/650 |
| 9,038,000 B2* | 5/2015 | Haynes, II | G06Q 30/0201 715/838 |
| 9,047,509 B2* | 6/2015 | Wolk | G06K 9/00456 |
| 9,262,488 B2* | 2/2016 | Sun | G06F 16/248 |
| 9,280,278 B2* | 3/2016 | Fujisawa | G06F 3/04817 |
| 9,317,937 B2* | 4/2016 | Le | G06T 11/00 |
| 9,323,807 B2* | 4/2016 | Werner | G06F 17/30398 |
| 9,367,237 B2* | 6/2016 | Nakasu | G06F 3/04883 |
| 9,405,449 B2* | 8/2016 | Winternitz | G06F 3/04845 |
| 9,466,138 B2* | 10/2016 | Singh | G06T 11/206 |
| 9,501,205 B2* | 11/2016 | Wang | G06F 17/30 |
| 9,547,840 B2* | 1/2017 | Zhang | G06F 3/04883 |
| 9,613,086 B1* | 4/2017 | Sherman | G06F 16/248 |
| 9,626,034 B2* | 4/2017 | Davidson | G06F 3/0416 |
| 9,710,760 B2* | 7/2017 | Hill | G06F 16/58 |
| 9,766,787 B2* | 9/2017 | Danton | G06F 3/0481 |
| 9,804,772 B2* | 10/2017 | Oh | G06F 3/04883 |
| 9,836,183 B1* | 12/2017 | Love | G06T 11/206 |
| 9,886,188 B2* | 2/2018 | Saito | G06F 3/0486 |
| 9,911,211 B1* | 3/2018 | Damaraju | G06T 11/206 |
| 10,073,596 B2* | 9/2018 | Joachim | G06F 17/30032 |
| 10,169,372 B2* | 1/2019 | Bleizeffer | G06F 17/30265 |
| 10,338,672 B2* | 7/2019 | Wernecke | G06F 3/04886 |
| 10,359,920 B2* | 7/2019 | Noda | G06F 3/04845 |
| 2002/0109737 A1* | 8/2002 | Jaeger | G06F 3/0481 715/863 |
| 2003/0079182 A1* | 4/2003 | Hofmann | G06F 3/0482 715/273 |
| 2003/0128244 A1* | 7/2003 | Iga | G06F 3/0488 715/863 |
| 2003/0167324 A1* | 9/2003 | Farnham | G06F 3/0481 709/224 |
| 2003/0179235 A1* | 9/2003 | Saund | G06F 3/04842 715/764 |
| 2003/0200191 A1* | 10/2003 | Pao | G06K 9/6232 706/47 |
| 2003/0215145 A1* | 11/2003 | Shilman | G06F 3/04883 382/195 |
| 2003/0233460 A1* | 12/2003 | Drucker | G06F 16/435 709/228 |
| 2004/0017376 A1* | 1/2004 | Tagliabue | H04M 1/27455 345/581 |
| 2004/0036716 A1* | 2/2004 | Jordahl | G06F 16/24578 715/713 |
| 2004/0119763 A1* | 6/2004 | Mizobuchi | G06F 3/04883 715/863 |
| 2005/0025357 A1* | 2/2005 | Landwehr | A01M 1/026 382/170 |
| 2005/0034080 A1* | 2/2005 | Jaeger | G06F 3/0481 715/767 |
| 2005/0114802 A1* | 5/2005 | Beringer | G06F 16/9038 715/700 |
| 2005/0209983 A1* | 9/2005 | MacPherson | G06N 5/02 |
| 2005/0281467 A1* | 12/2005 | Stahovich | G06K 9/00416 382/202 |
| 2006/0050969 A1* | 3/2006 | Shilman | G06F 3/04883 382/224 |
| 2006/0061776 A1* | 3/2006 | Chen | G06F 3/03545 358/1.1 |
| 2006/0085767 A1* | 4/2006 | Hinckley | G06F 3/04883 715/863 |
| 2006/0112354 A1* | 5/2006 | Park | G06F 3/0481 715/835 |
| 2006/0121436 A1* | 6/2006 | Kruse | G06F 3/0481 434/433 |
| 2006/0197763 A1* | 9/2006 | Harrison | G06Q 10/10 345/441 |
| 2006/0230056 A1* | 10/2006 | Aaltonen | G06F 16/58 |
| 2006/0290697 A1* | 12/2006 | Madden | G06T 11/206 345/440 |
| 2007/0136756 A1* | 6/2007 | Ishida | H04N 7/17318 725/46 |
| 2007/0180400 A1* | 8/2007 | Zotov | G06F 3/04883 715/788 |
| 2007/0211056 A1* | 9/2007 | Chakraborty | G06T 11/206 345/440 |
| 2007/0271270 A1* | 11/2007 | Dubinko | G06F 16/951 |

(56) References Cited

U.S. PATENT DOCUMENTS

| | | | |
|---|---|---|---|
| 2007/0271524 A1* | 11/2007 | Chiu | G06F 3/0481 715/767 |
| 2008/0040665 A1* | 2/2008 | Waldeck | G06F 3/0482 715/277 |
| 2008/0104526 A1* | 5/2008 | Jaeger | G06F 3/0481 715/763 |
| 2008/0104527 A1* | 5/2008 | Jaeger | G06F 3/0481 715/763 |
| 2008/0104571 A1* | 5/2008 | Jaeger | G06F 3/0481 717/113 |
| 2008/0235211 A1* | 9/2008 | Saund | G06F 16/24578 |
| 2008/0307350 A1* | 12/2008 | Sabatelli | G06F 3/0481 715/779 |
| 2009/0003658 A1* | 1/2009 | Zhang | G06F 17/30523 382/113 |
| 2009/0024965 A1* | 1/2009 | Zhdankin | G06F 40/30 715/863 |
| 2009/0028435 A1* | 1/2009 | Wu | G06K 9/34 382/190 |
| 2009/0100333 A1* | 4/2009 | Xiao | G06T 11/206 715/252 |
| 2009/0100343 A1* | 4/2009 | Lee | G06F 3/04817 715/733 |
| 2009/0100383 A1* | 4/2009 | Sunday | G06F 3/04883 715/863 |
| 2009/0158214 A1* | 6/2009 | Arnold | G06F 16/44 715/830 |
| 2009/0198562 A1* | 8/2009 | Wiesinger | G06Q 30/02 705/35 |
| 2009/0307623 A1* | 12/2009 | Agarawala | G06F 3/04815 715/765 |
| 2010/0007623 A1* | 1/2010 | Kaneko | G06F 3/04817 345/173 |
| 2010/0023862 A1* | 1/2010 | Tai | G06F 16/583 715/721 |
| 2010/0058182 A1* | 3/2010 | Jung | G06F 3/04845 715/702 |
| 2010/0083111 A1* | 4/2010 | de los Reyes | G06F 3/0482 715/702 |
| 2010/0095248 A1* | 4/2010 | Karstens | G06F 3/048 715/846 |
| 2010/0106752 A1* | 4/2010 | Eckardt, III | G06F 17/30696 707/805 |
| 2010/0169323 A1* | 7/2010 | Liu | G06F 16/334 707/748 |
| 2010/0171754 A1* | 7/2010 | Hatfield | G06F 17/242 345/619 |
| 2010/0273457 A1* | 10/2010 | Freeman | H04L 51/24 455/412.2 |
| 2010/0313124 A1* | 12/2010 | Privault | G06F 3/04812 715/702 |
| 2010/0318929 A1* | 12/2010 | Hilton | G06F 3/0486 715/769 |
| 2011/0072012 A1* | 3/2011 | Ah-Pine | G06F 16/26 707/725 |
| 2011/0283205 A1* | 11/2011 | Nie | G06F 16/9535 715/763 |
| 2012/0005045 A1* | 1/2012 | Baker | G06Q 30/0643 705/27.2 |
| 2012/0042283 A1* | 2/2012 | Tuesta | G06F 3/0482 715/834 |
| 2012/0054226 A1* | 3/2012 | Cao | G06F 16/34 707/769 |
| 2012/0110519 A1* | 5/2012 | Werner | G06F 16/2428 715/863 |
| 2012/0144309 A1* | 6/2012 | Zendler | G06F 3/04815 715/739 |
| 2012/0169772 A1* | 7/2012 | Werner | G06F 3/0481 345/660 |
| 2012/0216114 A1* | 8/2012 | Privault | G06F 3/04883 715/702 |
| 2012/0254790 A1* | 10/2012 | Colombino | G06F 3/0482 715/781 |
| 2012/0256863 A1* | 10/2012 | Zhang | G06F 3/04883 345/173 |
| 2013/0129231 A1* | 5/2013 | Dale | G06K 9/6254 382/224 |
| 2013/0174074 A1* | 7/2013 | Strzygowski | G06F 3/048 715/771 |
| 2013/0275919 A1* | 10/2013 | Kamath | G06F 3/04847 715/846 |
| 2014/0012848 A1* | 1/2014 | Denney | G06F 16/367 707/737 |
| 2014/0015837 A1 | 1/2014 | Soshin | |
| 2014/0052763 A1* | 2/2014 | Sato | G06F 3/0488 707/805 |
| 2014/0059455 A1 | 2/2014 | Abdukalykov et al. | |
| 2014/0164073 A1* | 6/2014 | Mosley | G06Q 10/06398 705/7.42 |
| 2014/0164607 A1* | 6/2014 | Bai | H04L 43/045 709/224 |
| 2014/0164913 A1* | 6/2014 | Jaros | G06F 17/212 715/243 |
| 2014/0215299 A1* | 7/2014 | Bellamy | G06F 17/20 715/211 |
| 2014/0278093 A1* | 9/2014 | Raffa | G01C 21/3461 701/533 |
| 2015/0095316 A1 | 4/2015 | Nie et al. | |
| 2015/0169179 A1* | 6/2015 | Wang | G06F 16/00 715/835 |
| 2015/0339835 A1* | 11/2015 | Mohr | G06T 11/206 345/440 |
| 2017/0351752 A1* | 12/2017 | Meehan | G06F 16/353 |

\* cited by examiner

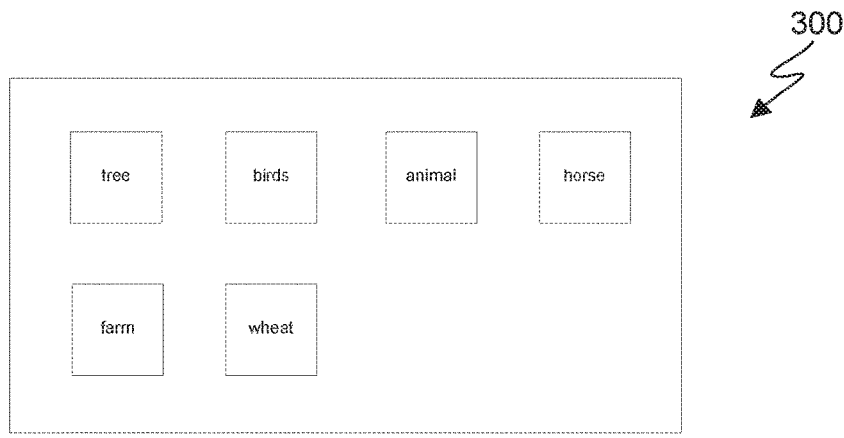
FIG. 3A
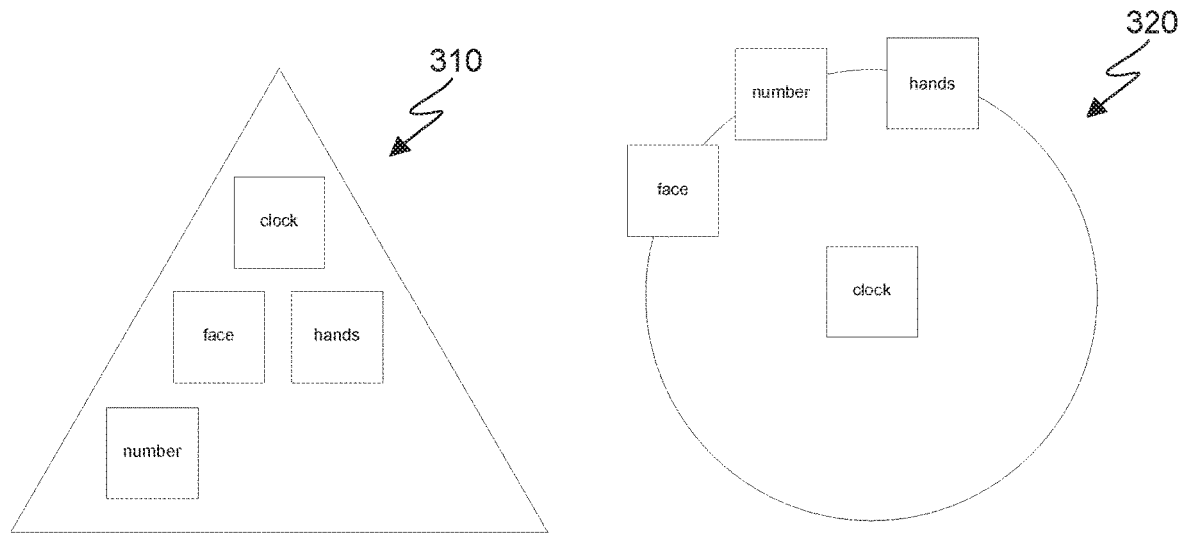
FIG. 3B
FIG. 3C

ENTITY ARRANGEMENT BY SHAPE INPUT

BACKGROUND OF THE INVENTION

The present invention relates generally to the field of computer programming, and more particularly to tools for manipulation of visual elements.

A user interface for a computer allows users to interact with electronic devices through graphical icons and visual indicators. A user can perform tasks by directly manipulating the graphical elements. Designing the visual composition and behavior of a user interface is an important part of software application programming in the area of human-computer interaction. A goal of a user interface is to enhance the efficiency and ease of use for the underlying logical design of a computer program. Users within various fields of computer science rely on the efficient functionality of a user interface. For example, text mining, in general, is the process of extracting quality information from text through tasks that include tasks include text categorization, text clustering, annotation/tagging, concept/entity extraction, production of granular taxonomies, document summarization, and entity relation modeling.

Current solutions for various text mining operations are typically cumbersome and ineffective. For example, user interface designs for text annotation operations for a document often display the text entities close together and in the same or similar arrangement as found in the document. This can cause some annotations of text entities to be close together or to overlap, preventing a user from efficient manipulation of the text entities and from effectively annotating the entities of the document. Additionally, user interface designs for text annotation operations often can not effectively display the entities being annotated while also displaying the underlying document, preventing a user from effectively organizing the entities for annotation operations.

SUMMARY

Embodiments of the present invention include a method, computer program product, and computer system for arranging entities by shape input. In an embodiment of the present invention, a figure is received, where the figure is created by a user. One or more entities are received in the figure. In response to receiving the one or more entities in the figure, the one or more entities are arranged in the figure according to a protocol. This embodiment provides the advantage of organizing entities of a document anywhere in the document that a user creates a figure, allowing for effective visualization of the entities being manipulated based on any shape created by the user as well as the remaining entities of the document, as opposed to displaying the entities being manipulated on top of, or overlapping, the remaining entities of the document.

In an embodiment of the present invention, a first entity is received in a figure. The first entity includes a first text content. A second entity is received in the figure. The second entity includes a second text content. A relatedness between the first text content and the second text content is determined. In response to receiving the second entity in the figure, the first entity and the second entity are arranged in the figure based on the relatedness. By displaying entities with similar text contents near one another, this embodiment provides the advantage of organizing entities of a document in a manner that allows for more efficient manipulation of the entities (e.g., annotation of the entities, which is a manipulation closely connected the text contents of the entities), as opposed to displaying the entities in the locations in which they are received from a user without further manipulation.

In an embodiment of the present invention, an organizational protocol is associated with each shape of multiple shapes based on dimensional features of each shape. In response to receiving an entity, an option to provide a shape of the multiple shapes is displayed. In response to receiving an indication to provide the shape of the multiple shapes, the shape is provided. In response to receiving the indication to provide the shape, the entity is arranged in the shape according to the organizational protocol associated with the shape. This embodiment provides the advantage of providing a user with an option to organize entities of a document anywhere in the document that a user creates a figure and based on a particular shape chosen by the user, allowing for effective visualization of the entities being manipulated according to the preference of the user as well as the remaining entities of the document, as opposed to displaying the entities being manipulated on top of, or overlapping, the remaining entities of the document.

BRIEF DESCRIPTION OF THE DRAWINGS

FIGS. 3A, 3B, and 3C are diagrams of example shapes and entity arrangements, in accordance with an embodiment of the present invention.

DETAILED DESCRIPTION

Embodiments of the present invention recognize that organization and manipulation of graphical elements of a computer user interface is a common and necessary task for many facets of computer science. Embodiments of the present invention recognize that current techniques for handling numerous entities are cumbersome and frustrating for users, for example as may occur when grouping several words of a text document together to assign the words a common tag or annotation. Embodiments of the present invention further recognize that current techniques for visually organizing entities become increasingly clumsy for users as a greater number of entities are being manipulated or otherwise perceived simultaneously.

Embodiments of the present invention provide techniques for grouping entities through manual shape input and arranging the grouped entities according to the relationships among the entities.

Figure 1:
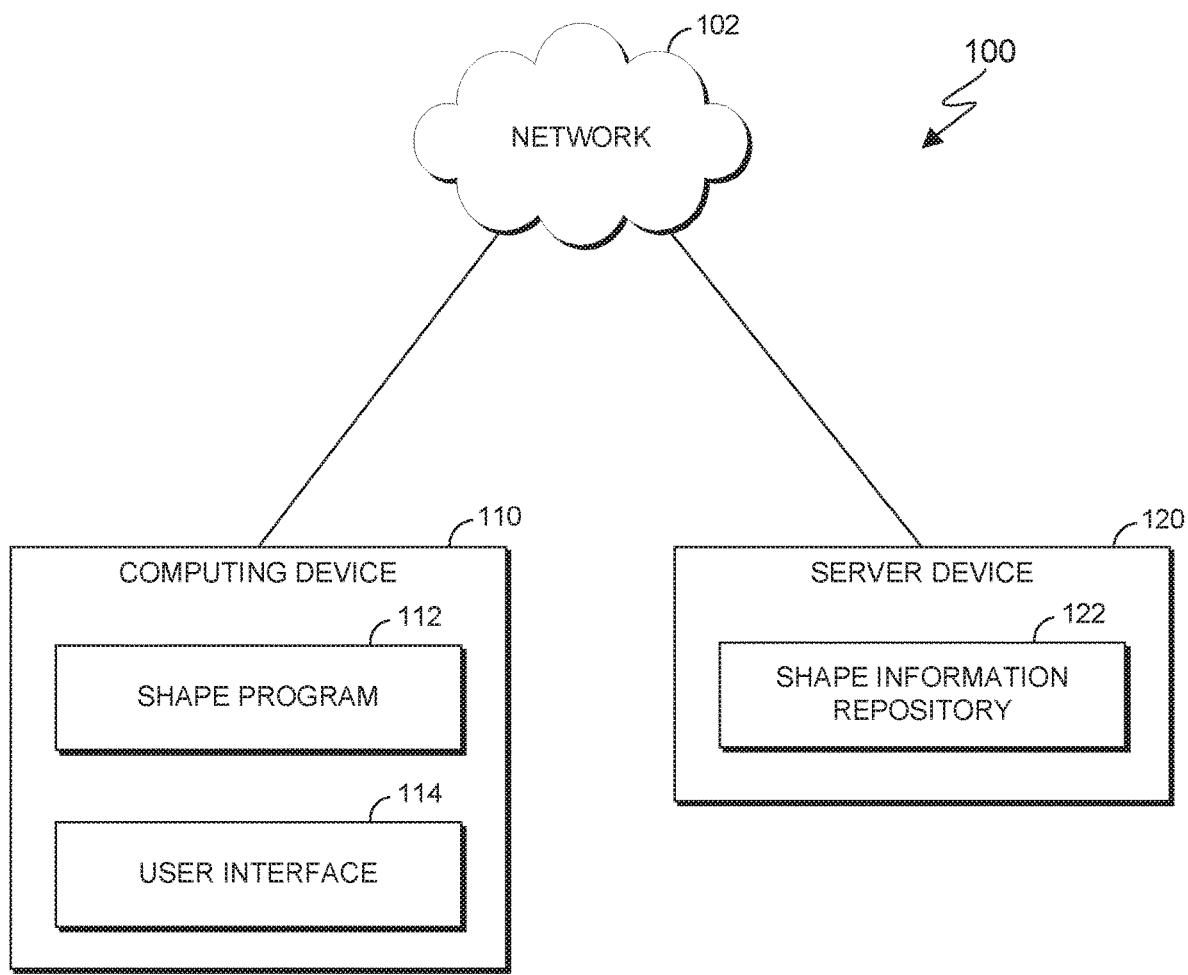
FIG. 1 is a functional block diagram of a distributed data processing environment, in accordance with an embodiment of the present invention.

The present invention will now be described in detail with reference to the Figures. FIG. 1 is a functional block diagram of a computing environment, generally designated 100, in accordance with an embodiment of the present invention. FIG. 1 provides only an illustration of one implementation and does not imply any limitations with regard to the environments in which different embodiments may be implemented. Those skilled in the art may make many modifications to the depicted environment without departing from the scope of the invention as recited by the claims.

In the illustrated embodiment, distributed data processing environment 100 includes computing device 110 and server device 120. Computing device 110 and server device 120 are interconnected through network 102. In an embodiment, distributed data processing environment 100 may additionally include any other computing device connected to network 102.

In an embodiment, network 102 may be a local area network (LAN), a telecommunications network, a wide area network (WAN) such as the Internet, or any combination of the three, and can include wired, wireless, or fiber optic connections. In general, network 102 may be any combination of connections and protocols supports communications between computing device 110, server device 120, and any other computing device connected to network 102, in accordance with embodiments of the present invention.

In an embodiment, computing device 110 may generally be any electronic device or combination of electronic devices capable of executing computer readable program instructions. In example embodiments, computing device 110 may be a mobile phone, personal digital assistant, tablet computer, personal computer, or workstation. In an embodiment, computing device 110 may be a computer system utilizing clustered computers and components (e.g., database server devices, application server devices) that act as a single pool of seamless resources when accessed by elements of distributed data processing environment 100, such as in a cloud computing environment. Computing device 110 may include components as depicted and described with respect to FIG. 3.

In the illustrated embodiment, computing device 110 includes shape program 112 and user interface 114. In an alternative embodiment, shape program 112 and user interface 114 may be located on another networked computing device (not shown), and shape program 112 and user interface 114 may access and communicate with computing device 110 through network 102. In an embodiment, computing device 110 may include one or more entity sources (not shown) such as a document, and each entity sources contains one or more entities. In an embodiment, an entity is any visually-represented object capable of being manipulated independently of other objects, such as a word within a document.

In an embodiment, shape program 112 may be a computer program, application, or subprogram of a larger program that communicates with user interface 114 and shape information repository 122 for grouping and arranging entities by manual shape input. In an embodiment, functions for grouping and arranging entities include shape recognition (e.g., identification and quantification of geometric features of drawing input), search and retrieval of information stored in shape information repository 122, and identification of relationships among a group words, in accordance with embodiments of the present invention.

In an embodiment, user interface 114 is the information, such as graphic, text, and sound, that shape program 112 presents to a user and the control sequences the user employs to control and interact with shape program 112. In an embodiment, user interface 114 may be a graphical user interface (GUI) whereby user interface 114 allows a user to interact with electronic devices, such as a keyboard or a mouse, through graphical icons and visual indicators, such as secondary notations, as opposed to text-based interfaces, typed command labels, or text navigation. GUIs were introduced for computers in response to the perceived steep learning curve of command-line interfaces, which required commands to be typed on the keyboard. A user may perform an action in user interface 114 through direct manipulation of the graphical elements.

In an embodiment, server device 120 may generally be any electronic device or combination of electronic devices capable of executing computer readable program instructions. In example embodiments, server device 120 may be a workstation, personal computer, personal digital assistant, or mobile phone. In an embodiment, server device 120 may be a computer system utilizing clustered computers and components (e.g., database server devices, application server devices) that act as a single pool of seamless resources when accessed by elements of distributed data processing environment 100, such as in a cloud computing environment.

In the illustrated embodiment, server device 120 includes shape information repository 122. In an alternative embodiment, shape information repository 122 may be located on computing device 110. In yet another alternative embodiment, shape information repository 122 may be located on another computing device (not shown) connected to network 102.

In an embodiment, shape information repository 122 contains the shape information determined by shape program 112, in accordance with embodiments of the present invention. In an embodiment, shape information repository 122 separately stores shape information of each user of shape program 112. In an embodiment, shape information repository 122 additionally stores shape information of all users of shape program 112 in an aggregated manner. In an embodiment, the shape information includes including the number of continuous lines of a shape, the number and size (or magnitude) of angles of a shape, the colors of drawn pixels as compared to background pixels, the area of a shape, locational features of the drawing (e.g., the locations of axes), and the determined shape of a drawing. In an embodiment, shape information may include a conceptual dictionary, which may include a dictionary with word definitions, a thesaurus with word synonyms and antonyms, and other information regarding the relationships among words.

In an embodiment, shape information repository 122 may be implemented using any non-volatile storage media known in the art. For example, shape information repository 122 may be implemented with a tape library, optical library, one or more independent hard disk drives, or multiple hard disk drives in a redundant array of independent disks (RAID). Shape information repository 122 may be implemented using any suitable storage architecture known in the art. For example, shape information repository 122 may be implemented with a relational database or an object-oriented database.

Figure 2:
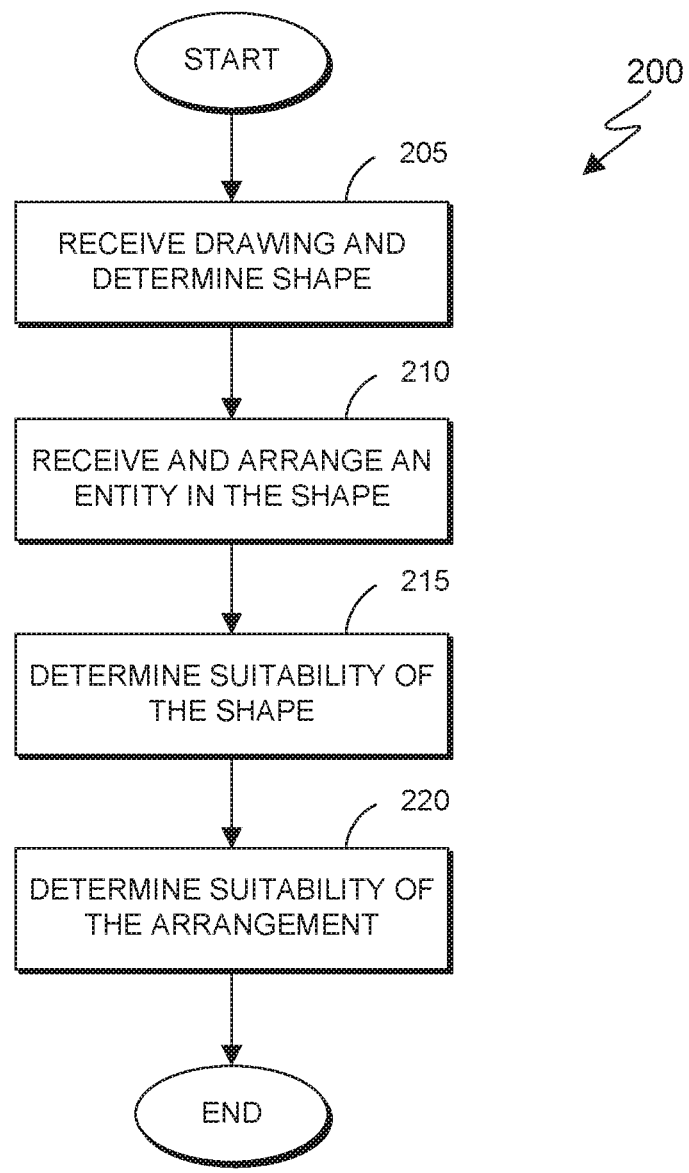
FIG. 2 is a flowchart of operational steps for grouping and arranging entities by manual shape input, in accordance with an embodiment of the present invention.

FIG. 2 is a flowchart of workflow 200 illustrating operational steps for grouping and arranging entities by manual shape input. In the illustrated embodiment, the steps of workflow 200 is performed by shape program 112. In an alternative embodiment, the steps of workflow may be performed by any other computer program, or programs, while working with learning shape program 112. In an embodiment, shape program 112 begins performing the steps of workflow 200 in response to receiving an indication to provide functions for grouping and arranging entities of a document (not shown). In an embodiment, a user may provide the indication through user interface 114.

Shape program 112 receives a drawing and determines a shape (step 205). In other words, shape program 112 receives a drawing, and shape program 112 determines the shape that the drawing most closely depicts. In an embodiment, the drawing may be provided to shape program 112 by a user through user interface 114. In an embodiment, the drawing may be provided through touch (e.g., from a finger of the user, from a stylus tool, etc.) or through an input/output (I/O) device (e.g., a mouse).

In an embodiment, shape program 112 identifies shape information of the drawing. In an embodiment, shape information includes features of the drawing such as the number of continuous lines, the nature of the lines (e.g., curved line or straight line), the number and size of angles (i.e., corners), the colors of drawn pixels as compared to background pixels, the area of the drawing, and locational features of the drawing (e.g., relative locations of axes, edges, etc.). Shape program 112 associates the shape information with the shape determined for the drawing (following such determination by shape program 112) and stores the shape information and associated shape in shape information repository 122.

In an embodiment, shape program 112 determines the shape of the drawing by comparing the shape information of the drawing to shape information associated with previously determined shapes stored in shape information repository 122. The shape information of previously determined shapes may correspond to the current user of shape program 112 as well as all other users of shape program 112. In an embodiment, shape program 112 may identify shapes in shape information repository 122 that are associated with features that are identical or similar to features of the current drawing, and shape program 112 associates an identified shape with the drawing. For example, shape program 112 may identify shapes in shape information repository 122 that have the same number of angles as the drawing. As another example, shape program 112 may identify shapes in shape information repository 122 that have the same number of curved lines as the drawing. In an embodiment, shape program 112 determines that the shape of the drawing is a rectangle, triangle, or circle. In an embodiment, shape program 112 determines that the shape is a free-form shape where shape program 112 determines that the drawing does not closely depict a rectangle, triangle, or circle.

Shape program 112 receives and arranges an entity in the shape (step 210). In other words, shape program 112 receives an entity (target entity) to be placed in the shape (i.e., the drawing), and shape program 112 places the target entity in the shape according to an arrangement. In an embodiment, shape program 112 receives the target entity upon the target entity being moved (i.e., thrown, dragged and dropped, etc.) from a document to the inner area of the shape by a user through user interface 114.

In an embodiment, shape program 112 determines shape information of the target entity, and shape program 112 stores the shape information in shape information repository 122. In an embodiment, shape information of the target entity includes the area, dimensional information (e.g., height and width), locational features (e.g., relative locations of axes, edges (i.e., outer lines), etc.), and text information associated with the target entity (e.g., the words displayed with the target entity).

In an embodiment, an arrangement, in general, is any organizational structure or pattern in which entities in a common shape are displayed by shape program 112. In an embodiment, the arrangement according to which shape program 112 places the target entity depends on the type of shape in which the target entity is received (i.e., rectangle, triangle, circle, free-form, etc.).

In an embodiment, where the shape is a rectangle, shape program 112 places the target entity in a row-based arrangement. If there is no other entity currently placed in the rectangle shape, shape program 112 places the target entity at the top left corner of the shape. If there is at least one other entity currently placed in the shape, shape program 112 determines the dimensions between the right edge of the last-placed entity and the right edge of the shape and compares the dimensions to the dimensions of the target entity. If shape program 112 determines that the target entity fits, shape program 112 places the target entity between the right edge of the last-placed entity and the right edge of the shape. If shape program 112 determines that the target entity does not fit, shape program 112 places the target entity at the left edge of the shape and immediately below the last-placed row of entities. In an embodiment, shape program 112 may determine shape and target entity dimensions by utilizing shape information (e.g., heights, widths, areas, location of axes, etc.) in shape information repository 122.

In an embodiment, where the shape is a triangle, shape program 112 places the target entity in a row-based arrangement. If there is no other entity currently placed in the triangle shape, shape program 112 places the target entity at the top corner of the shape. If there is at least one other entity currently placed in the shape, shape program 112 determines the dimensions between the right edge of the last-placed entity and the right edge of the shape and compares the dimensions to the dimensions of the target entity. If shape program 112 determines that the target entity fits, shape program 112 places the target entity between the right edge of the last-placed entity and the right edge of the shape. If shape program 112 determines that the target entity does not fit, shape program 112 places the target entity at the left edge of the shape and immediately below the last-placed row of entities. In an embodiment, shape program 112 may determine shape and target entity dimensions by utilizing shape information (e.g., heights, widths, areas, location of axes, etc.) in shape information repository 122.

In an embodiment, where the shape is a circle, shape program 112 places the target entity in a circular arrangement. If there is no other entity currently placed in the triangle shape, shape program 112 places the target entity at the center of the shape. If there is at least one other entity currently placed in the shape, shape program 112 places the target entity at the point on the edge of the shape that is closest to the point to which the target entity was moved (i.e., thrown, dropped) by the user. If shape program 112 determines that there is another entity currently placed at that point, then shape program 112 places the target entity at the next closest, available point on the edge of the shape. In an embodiment, shape program 112 may determine shape and target entity dimensions by utilizing shape information (e.g., heights, widths, areas, location of axes, etc.) in shape information repository 122.

In an embodiment, where the shape is a free-form shape, shape program 112 may place the target entity in any of the previously discussed arrangements. For example, shape program 112 may provide arrangement options for arranging the entity, and a user, through the user interface of shape program 112, may indicate the arrangement to be used. In an alternative embodiment, where the shape is a free-form shape, shape program 112 may leave the entity placed at the same location at which the target entity was received in the shape.

Shape program 112 determines the suitability of the shape (step 215). In other words, in an embodiment, shape program 112 determines if the determined shape (e.g., a rectangle, triangle, circle, etc.) is suitable for displaying the current set of entities. In an embodiment, where shape program 112 determines that a different shape is more suitable, shape program 112 provides a suggestion to change the shape accordingly, or, alternatively, shape program 112 automatically changes the shape and re-arranges the entities accordingly.

In an embodiment, shape program 112 may determine suitability of the shape based on the text information of the current set of entities. For example, in an embodiment, shape program 112 may searching shape information in shape information repository 122 for the text information of current set of entities (e.g., the word of each entity) and determining if a different shape is more frequently utilized for the current set, or a similar set, of entities.

In an embodiment, shape program 112 may change the shape in response to receiving a subsequent drawing that encloses the current shape. In this case, shape program 112 changes the shape to the new drawing and, after determining the shape of the new drawing (see step 205), re-arranges the entities according to the arrangement associated with the determined new shape. For example, if the current shape is a circle, and a rectangle is subsequently drawn such that the rectangle encloses the circle, shape program 112 will change the utilized shape from the circle to the rectangle and will place the entities in a row-based arrangement.

Shape program 112 determines the suitability of the arrangement (step 220). In other words, shape program 112 determines if a different arrangement of the entities is more suitable for the current set of entities. In an embodiment, where shape program 112 determines that a different arrangement is more suitable, shape program 112 provides a suggestion to re-arrange the entities accordingly, or, alternatively, shape program 112 automatically re-arranges the entities accordingly.

In an embodiment, where the shape is a rectangle, a more suitable arrangement may be arranging the words of the entities in alphabetical order or in order of similarity of meanings. For example, words with more similar meanings are placed closer to each other than are words with less similar meanings.

In an embodiment, where the shape is a triangle, a more suitable arrangement may be arranging the words of the entities such that the word that is related to all of the other words, or is related to more words than any other single word, is placed at the top corner of the triangle and the word that is related to the fewest other words is placed at the lowest row in the farthest right position.

In an embodiment, where the shape is a circle, a more suitable arrangement may be arranging the words of the entities such that the word that is related to all of the other words, or is related to more words than any other single word, is placed at the center of the circle.

In an embodiment, to determine the similarity of meanings of words and the relatedness of words, shape program 112 may utilize a conceptual dictionary (not shown), which may include a dictionary with definitions, a thesaurus with synonyms and antonyms, and other information regarding the relationships among words.

FIGS. 3A, 3B, and 3C depict rectangle shape 300, triangle shape 310, and circle shape 320, respectively, which illustrate examples of shape drawings and entity arrangements.

Rectangle shape 300 is an example of a drawing that is determined by shape program 112 to be a rectangle. The entities in rectangle shape 300 are placed in a row-based arrangement (as discussed in step 210) and are further organized according to the similarity of the meanings of the text content in each entity (as discussed in step 220). For example, since birds are animals and live in trees, and birds have no close relation to wheat or farms, the entity with the word "birds" is placed between the entities with the terms "tree" and "animal" while being placed far from the entity with the term "wheat".

Triangle shape 310 is an example of a drawing that is determined by shape program 112 to be a triangle. The entities in triangle shape 310 are placed in a row-based arrangement (as discussed in step 210) and are further organized according to the relatedness of the meanings of the text content in each entity (as discussed in step 220). For example, since a clock is closely related to the terms in every other entity in the shape, the entity with "clock" is placed at the top of the triangle. Similarly, since numbers are only closely related to one other term (i.e., "clock"), it is placed at the bottom of the triangle.

Circle shape 320 is an example of a drawing that is determined by shape program 112 to be a circle. The entities in circle shape 320 are placed in a circular arrangement (as discussed in step 210) and are further organized according to the relatedness of the meanings of the text content in each entity (as discussed in step 220). For example, since a clock is related to the terms in every other entity, the entity with "clock" is placed in the middle of the circle with all other terms surrounding that entity.

Figure 4:
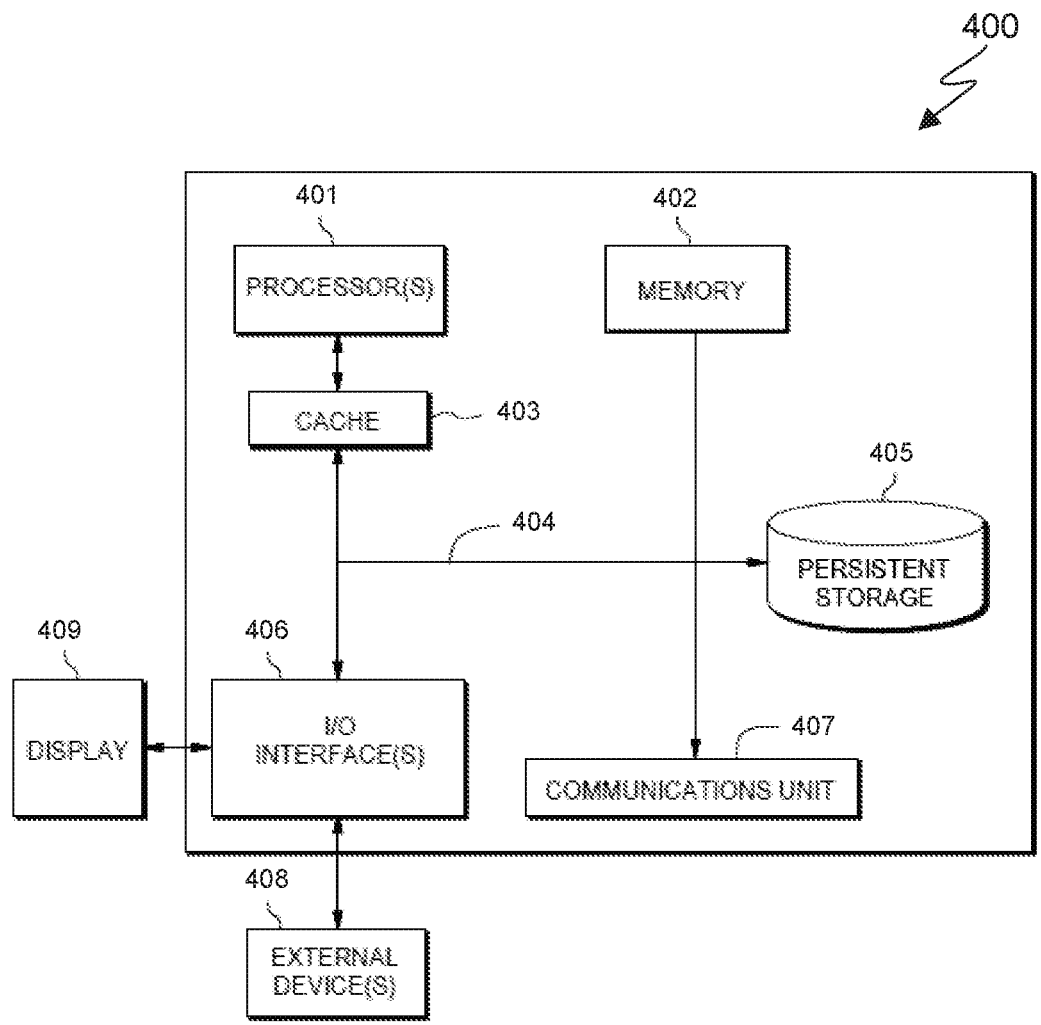
FIG. 4 is a functional block diagram of components of the computing device of FIG. 1, in accordance with an embodiment of the present invention.

FIG. 4 depicts computing system 400, which illustrates components of computing device 110 including shape program 112. Computing system 400 includes processor(s) 401, cache 403, memory 402, persistent storage 405, communications unit 407, I/O interface(s) 406, and communications fabric 404. Communications fabric 404 provides communications between cache 403, memory 402, persistent storage 405, communications unit 407, and I/O interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 may be implemented with one or more buses or a crossbar switch.

Memory 402 and persistent storage 405 are computer readable storage media. In an embodiment, memory 402 includes random access memory (RAM) (not shown). In general, memory 402 may include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 through I/O interface(s) 406. I/O interface(s) 406 also connect to display 409.

Display 409 provides a mechanism to display data to a user and may be, for example, a computer monitor.

The descriptions of the various embodiments of the present invention have been presented for purposes of illustration, but are not intended to be exhaustive or limited to the embodiments disclosed. Modifications and variations of the presented embodiments will be apparent to those of ordinary skill in the art without departing from the scope and spirit of the invention. The terminology used herein was chosen to best explain the principles of the embodiment, to best explain the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method, the method comprising:
   receiving, by the one or more processors, input from a user, wherein the user defines a portion of text data in a document associated with a shape;
   responsive to receiving input from a user that defines a shape, generating, by one or more processors, a visual representation of the shape within a graphical user interface, wherein (a) a border of the shape defines an organizational structure for a given plurality of target entities that are placeable within the shape and (b) wherein the visual representation is associated with (i) a type of hierarchy, (ii) a data repository and (iii) a set of organized data;
   determining, by the one or more processors, that the set of organized data (i) is associated with a computing device, (ii) indicates a document that includes a plurality of entities, and (iii) indicates a text content that includes the plurality of target entities;
   determining, by the one or more processors, that a pattern of input in the visual representation matches a pattern for a given organizational structure stored in the data repository; and
   generating, by the one or more processors, a modified organizational structure by modifying the given organizational structure stored in the data repository, wherein the modifying includes populating the visual representation with the plurality of target entities based, at least, in part on the text content.

2. The method of claim 1, the method further comprising:
   generating, by the one or more processors, a first drawing on the computing device that is associated with the pattern of input in the visual representation that includes a set of dimensional articles;
   generating, by the one or more processors, the modified organizational structure based, at least, on (i) the set of dimensional articles, (ii) the pattern for the organizational structures stored in the data repository and (iii) the first drawing; and
   storing, by the one or more processors, the modified organizational structure based, at least, on the set of dimensional articles.

3. The method of claim 1, the method further comprising:
   responsive to generating the modified organizational structure, identifying, by the one or more processors, one or more patterns for organizational structures stored in the data repository and determining that the modified organizational structure matches, at least, one pattern for the given organizational structure stored in the data repository based, at least, in part on the set of dimensional articles; and
   generating, by the one or more processors, a shape defined as the given organizational structure having a set of one or more articles that are relationally adjoined based, at least, in part on (i) the modified structure and (ii) the set of dimensional articles.

4. The method of claim 3, the method further comprising:
   responsive to generating a shape defined as the modified organizational structure having a set of one or more articles that are relationally adjoined, identifying, by the one or more processors, (i) the plurality of target entities that are associated with the set of organized data and (ii) the text content, are placed in the shape defined as the organizational structure having a set of one or more articles that are relationally adjoined, wherein the plurality of target entities are axially dispositioned on the shape defined as the organizational structure having a set of one or more articles that are relationally aligned.

5. The method of claim 4, the method further comprising:
   populating, by the one or more processors, the shape defined as the organizational structure having a set of one or more articles that are relationally adjoined, with the plurality of target entities that are associated with (i) the type of hierarchy, (ii) the set of organized data and (iii) the text content;
   generating, by the one or more processors, a target enriched shape defined as the modified organizational structure having a set of one or more articles that are relationally adjoined that is associated with (i) the type of hierarchy, (ii) the plurality of target entities and (iii) the modified organizational structure; and
   storing, by the one or more processors, a target enriched shape defined as the modified organizational structure having a set of one or more articles that are relationally adjoined.

6. The method of claim 1, the method further comprising:
   identifying, by the one or more processors, a disposition of the plurality of target entities relative to a border of the given organizational structure based, at least, in part on the (i) the patterns for organizational structures stored in the data repository, (ii) the set of organized data and (iii) an affinity of the text content of the plurality of target entities; and generating, by the one or more processors, a second shape defined as at least one organizational structure having a set of one or more articles that are relationally adjoined that is associated with the (i) type of hierarchy, (ii) the disposition of the plurality of target entities and (iii) the patterns of the structures stored in the data repository.

7. The method of claim 1, the method further comprising:

executing, by the one or more processors, a second shape defined as at least one organizational structure having a set of one or more articles that are relationally adjoined that is associated with the (i) type of hierarchy, (ii) disposition of the plurality of target entities and (iii) the affinity of the text content of the plurality of target entities; and storing, by the one or more processors, a second shape defined as the at least one organizational structure having a set of one or more articles that are relationally adjoined that is associated with the (i) type of hierarchy, (ii) disposition of the plurality of target entities and (iii) the affinity of the text content of the plurality of target entities.

8. The method of claim 2, wherein the dimensional articles of the modified organizational structure include one or more of the following: an area of the structure, a number of line segments of the structure, the line segments associated with (i) a linear or (ii) circular element of the structure, a plurality of angles of the structures, a size of each angle of the structure, and each line segment of each angle axially adjoined of the structure.

9. A computer program product, the computer program product comprising a computer readable storage medium having program instructions embodied therewith, the program instructions readable by one or more processors to cause the one or more processors to:

receiving, by the one or more processors, input from a user, wherein the user defines a portion of text data in a document associated with a shape;

responsive to receiving input from a user that defines a shape, generate, by one or more processors, a visual representation of the shape within a graphical user interface, wherein (a) a border of the shape defines an organizational structure for a given plurality of target entities that are placeable within the shape and (b) wherein the visual representation is associated with (i) a type of hierarchy, (ii) a data repository and (iii) a set of organized data;

determine, by the one or more processors, that the set of organized data (i) is associated with a computing device, (ii) indicates a document that includes a plurality of entities, and (iii) indicates a text content that includes the plurality of target entities;

determine, by the one or more processors, that a pattern of input in the visual representation matches a pattern for a given organizational structure stored in the data repository; and generate, by the one or more processors, a modified organizational structure by modifying the given organizational structure stored in the data repository, wherein the modifying includes populating the visual representation with the plurality of target entities based, at least, in part on the text content.

10. The computer program product of claim 9, the computer program product comprising program instructions readable by one or more processors to cause the one or more processors to:

generate, by the one or more processors, a first drawing on the computing device that is associated with the pattern of input in the visual representation that includes a set of dimensional articles;

generate, by the one or more processors, the modified organizational structure based, at least, on (i) the set of dimensional articles, (ii) the pattern for the organizational structures stored in the data repository and (iii) the first drawing; and store, by the one or more processors, the modified organizational structure based, at least, on the set of dimensional articles.

11. The computer program product of claim 9, the computer program product comprising program instructions readable by one or more processors to cause the one or more processors to:

responsive to generating the modified organizational structure, identify, by the one or more processors, one or more patterns for organizational structures stored in the data repository and determining that the modified organizational structure matches, at least, one pattern for the given organizational structure stored in the data repository based, at least, in part on the set of dimensional articles; and generating, by the one or more processors, a shape defined as the given organizational structure having a set of one or more articles that are relationally adjoined based, at least, in part on (i) the modified structure and (ii) the set of dimensional articles.

12. The computer program product of claim 11, the computer program product comprising program instructions readable by one or more processors to cause the one or more processors to:

responsive to generating a shape defined as the modified organizational structure having a set of one or more articles that are relationally adjoined, identifying, by the one or more processors, (i) the plurality of target entities that are associated with the set of organized data and (ii) the text content, are placed in the shape defined as the organizational structure having a set of one or more articles that are relationally adjoined, wherein the plurality of target entities are axially dispositioned on the shape defined as the organizational structure having a set of one or more articles that are relationally aligned.

13. The computer program product of claim 12, the computer program product comprising program instructions readable by one or more processors to cause the one or more processors to:

populate, by the one or more processors, the shape defined as the organizational structure having a set of one or more articles that are relationally adjoined, with the plurality of target entities that are associated with (i) the type of hierarchy, (ii) the set of organized data and (iii) the text content;

generate, by the one or more processors, a target enriched shape defined as the modified organizational structure having a set of one or more articles that are relationally adjoined that is associated with (i) the type of hierarchy, (ii) the plurality of target entities and (iii) the modified structure; and store, by the one or more processors, a target enriched shape defined as the modified organizational structure having a set of one or more articles that are relationally adjoined.

14. The computer program product of claim 9, the computer program product comprising program instructions readable by one or more processors to cause the one or more processors to:
identify, by the one or more processors, a disposition of the plurality of target entities relative to a border of the given organizational structure based, at least, in part on the (i) the patterns for the organizational structures stored in the data repository, (ii) the set of organized data and (iii) an affinity of the text content of the plurality of target entities; and
generate, by the one or more processors, a second shape defined as at least one organizational structure having a set of one or more articles that are relationally adjoined that is associated with the (i) type of hierarchy, (ii) the disposition of the plurality of target entities and (iii) the patterns of the structures stored in the data repository.

15. The computer program product of claim 9, the computer program product comprising program instructions readable by one or more processors to cause the one or more processors to:
execute, by the one or more processors, a second shape defined as at least one organizational structure having a set of one or more articles that are relationally adjoined that is associated with the (i) type of hierarchy, (ii) disposition of the plurality of target entities and (iii) the affinity of the text content of the plurality of target entities; and
store, by the one or more processors, a second shape defined as the at least one organizational structure having a set of one or more articles that are relationally adjoined that is associated with the (i) type of hierarchy, (ii) disposition of the plurality of target entities and (iii) the affinity of the text content of the plurality of target entities.

16. The computer program product of claim 10, wherein the dimensional articles of the modified organizational structure include one or more of the following: an area of the structure, a number of line segments of the structure, the line segments associated with (i) a linear or (ii) circular element of the structure, a plurality of angles of the structures, a size of each angle of the structure, and each line segment of each angle axially adjoined of the structure.

17. A computer system, the computer system comprising:
one or more computer processors;
one or more computer readable storage medium; and
program instructions stored on the computer readable storage medium for execution by at least one of the one or more processors, the program instructions readable by one or more processors to cause the one or more processors to:
receiving, by the one or more processors, input from a user, wherein the user defines a portion of text data in a document associated with a shape;
responsive to receiving input from a user that defines a shape, generating, by one or more processors, a visual representation of the shape within a graphical user interface, wherein (a) a border of the shape defines an organizational structure for a given plurality of target entities that are placeable within the shape and (b) wherein the visual representation is associated with (i) a type of hierarchy, (ii) a data repository and (iii) a set of organized data;
determine, by the one or more processors, that the set of organized data (i) is associated with a computing device, (ii) indicates a document that includes a plurality of entities, and (iii) indicates a text content that includes the plurality of target entities;
determine, by the one or more processors, that a pattern of input in the visual representation matches a pattern for a given organizational structure stored in the data repository; and
generate, by the one or more processors, a modified organizational structure by modifying the given organizational structure stored in the data repository, wherein the modifying includes populating the visual representation with the plurality of target entities based, at least, in part on the text content.

18. The computer system of claim 17, the program instructions readable by one or more processors to cause the one or more processors to:
generate, by the one or more processors, a first drawing on the computing device that is associated with the pattern of input in the visual representation that includes a set of dimensional articles;
generate, by the one or more processors, the modified organizational structure based, at least, on (i) the set of dimensional articles, (ii) the pattern for the organizational structures stored in the data repository and (iii) the first drawing; and
store, by the one or more processors, the modified organizational structure based, at least, on the set of dimensional articles.

19. The computer system of claim 17, the program instructions readable by one or more processors to cause the one or more processors to:
responsive to generating the modified organizational structure, identify, by the one or more processors, one or more patterns for organizational structures stored in the data repository and determining that the modified organizational structure matches, at least, one pattern for the given organizational structure stored in the data repository based, at least, in part on the set of dimensional articles; and
generate, by the one or more processors, a shape defined as the given organizational structure having a set of one or more articles that are relationally adjoined based, at least, in part on (i) the modified structure and (ii) the set of dimensional articles.

20. The computer system of claim 17, the program instructions readable by one or more processors to cause the one or more processors to:
responsive to generating a shape defined as the modified organizational structure having a set of one or more articles that are relationally adjoined, identifying, by the one or more processors, (i) the plurality of target entities that are associated with the set of organized data and (ii) the text content, are placed in the shape defined as the organizational structure having a set of one or more articles that are relationally adjoined, wherein the plurality of target entities are axially dispositioned on the shape defined as the organizational structure having a set of one or more articles that are relationally aligned.

21. The computer system of claim 20, the program instructions readable by one or more processors to cause the one or more processors to:

populate, by the one or more processors, the shape defined as the organizational structure having a set of one or more articles that are relationally adjoined, with the plurality of target entities that are associated with (i) the type of hierarchy, (ii) the set of organized data and (iii) the text content;

generate, by the one or more processors, a target enriched shape defined as the modified organizational structure having a set of one or more articles that are relationally adjoined that is associated with (i) the type of hierarchy, (ii) the plurality of target entities and (iii) the modified organizational structure; and store, by the one or more processors, a target enriched shape defined as the modified organizational structure having a set of one or more articles that are relationally adjoined.

22. The computer system of claim 17, the program instructions readable by one or more processors to cause the one or more processors to:

identify, by the one or more processors, a disposition of the plurality of target entities relative to a border of the given organizational structure based, at least, in part on the (i) the patterns for organizational structures stored in the data repository, (ii) the set of organized data and (iii) an affinity of the text content of the plurality of target entities; and generate, by the one or more processors, a second shape defined as at least one organizational structure having a set of one or more articles that are relationally adjoined that is associated with the (i) type of hierarchy, (ii) the disposition of the plurality of target entities and (iii) the patterns of the structures stored in the data repository.

23. The computer system of claim 17, the program instructions readable by one or more processors to cause the one or more processors to:

execute, by the one or more processors, a second shape defined as at least one organizational structure having a set of one or more articles that are relationally adjoined that is associated with the (i) type of hierarchy, (ii) disposition of the plurality of target entities and (iii) the affinity of the text content of the plurality of target entities; and store, by the one or more processors, a second shape defined as the at least one organizational structure having a set of one or more articles that are relationally adjoined that is associated with the (i) type of hierarchy, (ii) disposition of the plurality of target entities and (iii) the affinity of the text content of the plurality of target entities.

24. The computer system of claim 17, wherein the dimensional articles of the modified organizational structure include one or more of the following: an area of the structure, a number of line segments of the structure, the line segments associated with (i) a linear or (ii) circular element of the structure, a plurality of angles of the structures, a size of each angle of the structure, and each line segment of each angle axially adjoined of the structure.

25. A method, the method comprising:

receiving, by the one or more processors, input from a user, wherein the user defines a portion of text data in a document associated with a shape;

responsive to receiving input from a user that defines a shape, generating, by one or more processors, a visual representation of the shape within a graphical user interface, wherein (a) a border of the shape defines a modified organizational structure for a given plurality of target entities that are placeable within the shape and (b) wherein the visual representation is associated with (i) a type of hierarchy, (ii) a data repository and (iii) a set of organized data;

determining, by the one or more processors, that the set of organized data (i) is associated with a computing device, (ii) indicates a document that includes a plurality of entities, and (iii) indicates a text content that includes the plurality of target entities;

determining, by the one or more processors, that the plurality of target entities is associated with one or more given related entities, wherein, the one or more related entities has a set of characteristics in common with characteristics of the plurality of target entities;

determining, by the one or more processors, that the plurality of target entities is associated with (i) a set of organized data, (ii) a set of characteristics of the related target entities, and (iii) matches a pattern of related target entities; and generating, by the one or more processors, a modified organizational structure by modifying an organizational structure stored in a repository, wherein the modifying includes populating the visual representation with the related target entities based, at least in part, on the set of characteristics.

* * * * *